(12) United States Patent
Gedevanishvili et al.

(10) Patent No.: US 8,389,034 B2
(45) Date of Patent: Mar. 5, 2013

(54) CHEWABLE POUCH FOR FLAVORED PRODUCT DELIVERY

(75) Inventors: Shalva Gedevanishvili, Richmond, VA (US); Dennis Geib, Richmond, VA (US); Bruce Waymack, Prince George, VA (US); William R. Sweeney, Richmond, VA (US); Cindy Hayes, Midlothian, VA (US); Danielle R. Crawford, Chester, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 13/219,268

(22) Filed: Aug. 26, 2011

(65) Prior Publication Data

US 2011/0318450 A1      Dec. 29, 2011

Related U.S. Application Data

(63) Continuation of application No. 12/155,547, filed on Jun. 5, 2008, now Pat. No. 8,029,837.

(60) Provisional application No. 60/929,029, filed on Jun. 8, 2007.

(51) Int. Cl.
*B65D 81/32* (2006.01)
*A24F 47/00* (2006.01)
*B65D 81/34* (2006.01)
*A24B 15/00* (2006.01)

(52) U.S. Cl. ......... 426/112; 426/394; 131/347; 131/352

(58) Field of Classification Search ............ 426/78, 426/79, 80, 81, 82, 83, 84, 77, 112, 394; 131/111, 112, 116, 117, 118, 347, 352, 353, 131/354, 355, 356, 357, 358, 359
See application file for complete search history.

(56) References Cited

U.S. PATENT DOCUMENTS

| | | | |
|---|---|---|---|
| 865,026 | A | 9/1907 | Ellis |
| 904,521 | A | 11/1908 | Ellis |
| 1,376,586 | A | 5/1921 | Schwartz |
| 3,757,798 | A | 9/1973 | Lambert |
| 4,317,837 | A | 3/1982 | Kehoe et al. |
| 4,545,392 | A | 10/1985 | Sensabaugh, Jr. et al. |
| 4,606,357 | A | 8/1986 | Dusek et al. |
| 4,617,945 | A | 10/1986 | Vos et al. |
| 4,624,269 | A | 11/1986 | Story et al. |
| 4,917,161 | A | 4/1990 | Townend |
| 4,975,270 | A | 12/1990 | Kehoe |
| 5,092,352 | A | 3/1992 | Sprinkle, III et al. |

(Continued)

FOREIGN PATENT DOCUMENTS

| | | |
|---|---|---|
| WO | WO 2006/004480 A1 | 1/2006 |
| WO | WO 2006/065192 A1 | 6/2006 |

(Continued)

OTHER PUBLICATIONS

International Search Report and Written Opinion dated Jul. 9, 2009 for PCT/IB2008/002549.

(Continued)

*Primary Examiner* — Rena Dye
*Assistant Examiner* — Chaim Smith
(74) *Attorney, Agent, or Firm* — Buchanan Ingersoll & Rooney PC

(57) ABSTRACT

Provided is a disintegrable or non-disintegrable oral flavor delivery product. The product includes a disintegrable or non-disintegrable chewable pouch with a plurality of perforations. The pouch encloses a non-tobacco flavor product that can be in a gel, semi-liquid, and/or liquid form. A user chews, sucks, and/or manipulates the pouch to cause the enclosed flavor product to leach out of the perforations into the user's mouth.

7 Claims, 1 Drawing Sheet

U.S. PATENT DOCUMENTS

| | | |
|---|---|---|
| 5,167,244 A | 12/1992 | Kjerstad |
| 5,346,734 A | 9/1994 | Wydick, Jr. |
| 5,387,416 A | 2/1995 | White et al. |
| 6,162,516 A | 12/2000 | Derr |
| 7,032,061 B2 | 4/2006 | Huch et al. |
| D568,576 S | 5/2008 | Neidle et al. |
| 7,810,507 B2 | 10/2010 | Dube et al. |
| 7,819,124 B2 | 10/2010 | Strickland et al. |
| 7,861,728 B2 | 1/2011 | Holton, Jr. et al. |
| 7,913,699 B2 | 3/2011 | Strickland et al. |
| 7,918,231 B2 | 4/2011 | Strickland et al. |
| 7,950,399 B2 | 5/2011 | Winterson et al. |
| 7,980,251 B2 | 7/2011 | Winterson et al. |
| 2002/0170567 A1 | 11/2002 | Rizzotto et al. |
| 2003/0224090 A1 | 12/2003 | Pearce et al. |
| 2004/0247649 A1 | 12/2004 | Pearce et al. |
| 2004/0247744 A1 | 12/2004 | Pearce et al. |
| 2004/0247746 A1 | 12/2004 | Pearce et al. |
| 2005/0003048 A1 | 1/2005 | Pearce et al. |
| 2005/0061339 A1 | 3/2005 | Hansson et al. |
| 2005/0100640 A1 | 5/2005 | Pearce |
| 2005/0244521 A1 | 11/2005 | Strickland et al. |
| 2006/0073190 A1 | 4/2006 | Carroll et al. |
| 2006/0099300 A1 | 5/2006 | Andersen et al. |
| 2006/0147580 A1 | 7/2006 | Nissen et al. |
| 2006/0191548 A1 | 8/2006 | Strickland et al. |
| 2007/0031539 A1 | 2/2007 | Calton, Jr. |
| 2007/0062549 A1 | 3/2007 | Holton, Jr. et al. |
| 2007/0087036 A1 | 4/2007 | Durschlag et al. |
| 2007/0122526 A1 | 5/2007 | Sweeney et al. |
| 2007/0207239 A1 | 9/2007 | Neidle et al. |
| 2007/0261707 A1 | 11/2007 | Winterson et al. |
| 2008/0202533 A1 | 8/2008 | Mishra et al. |
| 2008/0202536 A1 | 8/2008 | Torrence et al. |
| 2008/0317911 A1 | 12/2008 | Schleef et al. |
| 2009/0004329 A1 | 1/2009 | Gedevanishvili et al. |
| 2009/0038631 A1 | 2/2009 | Mishra et al. |
| 2009/0301505 A1 | 12/2009 | Liu et al. |

FOREIGN PATENT DOCUMENTS

| | | |
|---|---|---|
| WO | WO 2006/105173 A2 | 10/2006 |
| WO | WO 2006/120570 A2 | 11/2006 |
| WO | WO 2007/037962 A1 | 4/2007 |
| WO | WO 2007/057789 A2 | 5/2007 |

OTHER PUBLICATIONS

International Preliminary Report on Patentability dated Dec. 11, 2009 for PCT/IB2008/002549.

CHEWABLE POUCH FOR FLAVORED PRODUCT DELIVERY

CROSS-REFERENCE TO RELATED APPLICATIONS

This application is a continuation application of U.S. application Ser. No. 12/155,547 entitled CHEWABLE POUCH FOR FLAVORED PRODUCT DELIVERY, filed on Jun. 5, 2008 now U.S. Pat. No. 8,029,837, which claims priority under 35 U.S.C. §119(e) to U.S. provisional Application No. 60/929,029, filed on Jun. 8, 2007, the entire content of each which is incorporated herein by reference.

SUMMARY

Provided herein is an oral flavor delivery product. In a preferred embodiment, the oral flavor delivery product includes a chewable pouch having a plurality of perforations. Preferably, the chewable pouch is filled with a non-tobacco, flavor product. In an embodiment, the chewable pouch provides functional ingredients.

In a preferred embodiment, the oral flavor delivery product is placed in the mouth between the cheek and teeth. A user orally manipulates the pouch by chewing and sucking to release the flavor product through the perforations in the pouch to the user.

In an embodiment, the chewable pouch is a disintegrable and/or dissolvable chewable pouch. Preferably, if the pouch is disintegrable and/or dissolvable, the pouch has multiple layers, each having the same and/or different flavor and/or dissolution rate. Preferably, the disintegrable and/or dissolvable pouch is made of gelatin and/or carrageenan. After the enclosed non-tobacco flavor product has been consumed, the pouch is digested.

In another embodiment, the chewable pouch is a non-disintegrable and/or non-dissolvable chewable pouch. Preferably, the pouch is made of latex, silicone, plastic, rubber, and combinations thereof. After the enclosed non-tobacco, flavor product has been consumed; the chewable pouch is removed from the mouth and discarded.

Preferably, the chewable pouch material includes flavorants. In a preferred embodiment, the chewable pouch material is also impregnated with coffee and other botanical material such as teas, spices, and/or herbs.

Preferably, the non-tobacco flavor product is a liquid, a semi-liquid or a gel material. In an embodiment, the non-tobacco flavor product includes active ingredients selected from the group consisting of vitamins, nutrients, medicines, functional ingredients and combinations thereof.

Also provided is a method of making an oral flavor delivery pouch.

DETAILED DESCRIPTION

As described herein, a chewable pouch product provides a pleasurable oral sensorial experience coupled with mouth activity and controlled release of the enclosed flavor product.

Figure 1:
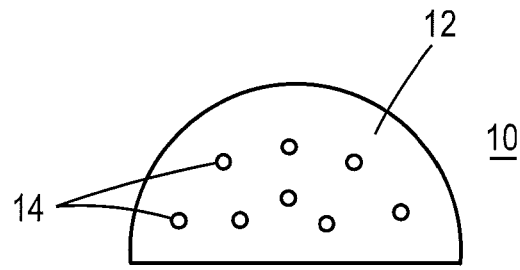
FIG. 1 is an illustration of a chewable pouch including a plurality of perforations.

FIG. 1 illustrates a chewable pouch product 10. In a preferred embodiment, the chewable pouch product 10 includes a chewable pouch 12 with at least one perforation 14 formed therein. Preferably, a non-tobacco flavor product 16 (shown in FIGS. 2, 3 and 4) is enclosed in the chewable pouch 12. When a user chews, sucks, and/or otherwise manipulates the pouch 12 the at least one perforation opens to release the enclosed non-tobacco flavor product.

Preferably, the chewable pouch product 10 weighs about 0.5 g to about 5.0 g. Of that weight, about 5% to about 50% is the weight of the chewable pouch 12. Preferably, about 50% to about 95% of the flavor delivery product weight is the weight of the enclosed flavor product 16 (shown in FIGS. 2, 3, and 4).

Also preferably, the chewable pouch product 10 is about 0.25 inches to about 2.0 inches in width, about 0.25 inches to about 2.0 inches in length, and about 0.25 inches to about 2.0 inches thick. Most preferably, the chewable pouch product 10 fits completely inside the user's mouth. Preferably, the chewable pouch product 10 fits discreetly within the user's mouth, and more preferably between the cheek and teeth.

Preferably, the chewable pouch product 10 is molded or formed in a shape selected from the group consisting of any shape selected from the group consisting of polygons, squares, rectangles, circles, ovals, heart, star, half-moon, crescent, pillow, leaf shapes, and combinations thereof. In a preferred embodiment, the chosen shape does not have sharp edges that may be uncomfortable to the user. In an embodiment, the shape of the chewable pouch product 10 indicates the flavor and/or functional ingredients contained therein. For example, a tea leaf shaped chewable pouch can contain teas and/or tea extracts.

In an embodiment, the chewable pouch 12 is made of a non-dissolvable and/or non-disintegrable pouch material. Once the enclosed flavor product 16 is consumed the pouch is discarded. Preferably, the non-dissolvable and/or non-disintegrable pouch is made of a food grade material selected from silicone, latex, rubber, plastic, and combinations thereof. Preferably, the chewable pouch 12 is an elastomeric material that is capable of deforming and reverting to its original configuration.

Preferably, the non-dissolvable and/or non-disintegrable chewable pouch 12 includes at least one perforation 14 through which the non-tobacco flavor product 16 exits the chewable pouch product 10 when in use. Preferably, the chewable pouch 12 is designed to selectively release the enclosed non-tobacco flavor product 16. The at least one perforation 14 does not open or allow the non-tobacco flavor product 16 to exit the chewable pouch 12 unless the chewable pouch 12 is deformed by chewing, sucking, or otherwise manipulating the pouch 12, causing the perforations to flex and open. Once the user has stopped chewing, sucking, and/or manipulating the elastomeric chewable pouch 12, the at least one perforation 14 closes by contracting to prevent the non-tobacco flavor product 16 from escaping the chewable pouch 12 via the at least one perforation 14.

In a preferred embodiment, the non-dissolvable and/or non-disintegrable pouch includes flavorants so that the pouch and the flavor product both provide flavor to the user.

In another embodiment, the chewable pouch 12 is a dissolvable and/or disintegrable pouch that can be chewed and swallowed after the inner flavor product 16 is consumed.

Preferably, the dissolvable and/or disintegrable pouch is made of a material selected from the group consisting of gelatin, carrageenan, alginate, starch, food grade casings, such as meat casings, and combinations thereof.

Preferably, the perforations of both the dissolvable and non-dissolvable pouches are formed so that the enclosed flavor product is only released when the pouch is chewed or manipulated orally so that the perforations flex to allow the product to exit. Preferably there are about 1 to about 10,000 perforations in each chewable pouch. The size and amount of the perforations can be altered to control the rate of release of the enclosed flavor product. The perforations can be molded therein or the perforations can be formed by a pin wheel during the manufacturing process.

The perforations can be formed in any shape including circles, squares, rectangles, ovals and the like. In an embodiment, the perforations can be piercings, such as pin holes or slits in the chewable pouch material.

Figure 2:
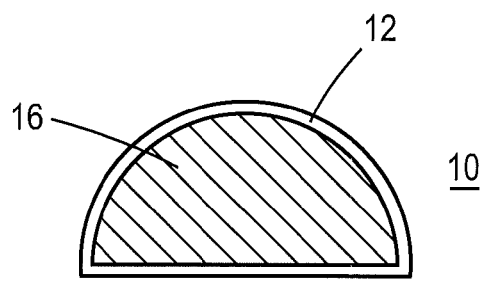
FIG. 2 is a cross-sectional view of an embodiment of an oral flavor delivery product.

In a preferred embodiment, the chewable pouch 10, as illustrated in FIG. 2, encloses a non-tobacco, flavor product 16.

Preferably, the non-tobacco flavor product 16 can include liquids, gels, semi-liquids, beads, capsules, and/or microcapsules. Preferably, the liquids, gels, and/or semi-liquids are at least somewhat viscous. It is preferred that the non-tobacco flavor product 16 is not so watery as to leak out of the perforations, and not so hard as to be difficult to squeeze out of the perforations when the chewable pouch 12 is being chewed or sucked.

The non-tobacco flavor product 16 can include berry flavorants such as, without limitation, pomegranate, acai, raspberry, blueberry, strawberry, and/or cranberry. Other suitable flavorants include, without limitation, any natural or synthetic flavor or aroma, such as menthol, peppermint, spearmint, bourbon, scotch, whiskey, cognac, hydrangea, lavender, chocolate, licorice, citrus and other fruit flavors, such as apple, peach, pear, cherry, plum, orange and grapefruit, gamma octalactone, vanillin, ethyl vanillin, breath freshener flavors, spice flavors such as cinnamon, clove, nutmeg, sage, anise, and fennel, methyl salicylate, linalool, jasmine, coffee, bergamot oil, geranium oil, lemon oil, and ginger oil.

In an embodiment, the non-tobacco flavor product 16 also includes sweeteners. Preferred sweeteners include, without limitation, water soluble sweeteners such as monosaccharides, disaccharides, and polysaccharides. For example, sweeteners such as xylose, ribose, sucrose, maltose, fructose, glucose, sucralose and mannose can be included.

In an embodiment, the non-tobacco flavor product 16 includes beads, capsules and/or microcapsules that are designed to contain liquid, semi-liquid, and/or gel additives that are released when the beads, capsules, and/or microcapsules rupture due to mechanical action or pH change. The non-tobacco flavor product 16 can also include powders and/or solids in addition to a gel, liquid and/or semi-liquid. In an embodiment, the user can control the release of the additives by choosing when to bite down on the beads, capsules, and/or microcapsules.

Preferably, the additives contained within the beads, capsules, and/or microcapsules can include flavorants, chemesthesis agents, antioxidants, vitamins, sweeteners, nutrients, and/or functional ingredients.

In a preferred embodiment, the functional ingredients include soothing agents and/or energizing agents. Suitable soothing agents include, without limitation, chamomile, lavender, jasmine, and the like. Preferably, the energizing ingredients or vitamins include, without limitation, caffeine, taurine, guarana, vitamin B6, vitamin B12, and the like.

Suitable chemesthesis ingredients provide, without limitation, hot, spicy, or cooling flavors such as mint, menthol, cinnamon, pepper, and the like.

Preferably, each pouch contains non-tobacco flavor product, which delivers flavor for about 2 minutes to about 30 minutes. More preferably, the non-tobacco flavor delivery of each pouch lasts about 5 minutes to about 20 minutes.

Figure 3:
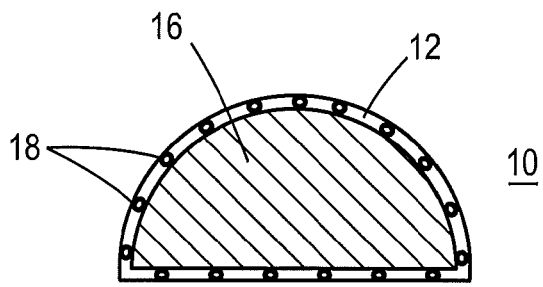
FIG. 3 is a cross-sectional view of an embodiment of an oral flavor delivery product including a chewable pouch impregnated with flavorants.

As illustrated in FIG. 3, in an embodiment, the oral flavor delivery product 10 includes a chewable pouch 12 impregnated with embedded flavor materials 18. Also preferably, the chewable pouch material is also impregnated with coffee and other botanical material such as teas, spices, and/or herbs. In a preferred embodiment, the flavor of the non-tobacco flavor product 16 contained in the chewable pouch 12 is the same flavor as the embedded flavor materials 18 of the chewable pouch 12. In another embodiment, the non-tobacco flavor product 16 has a different flavor than the embedded flavor materials 18.

Figure 4:
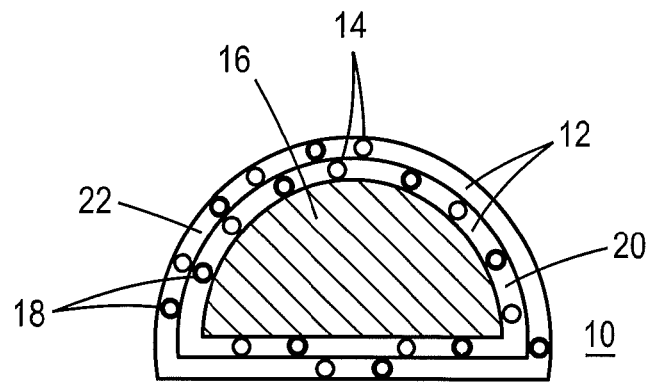
FIG. 4 is a cross-sectional view of an embodiment of a dissolvable and/or disintegrable oral flavor delivery product including a chewable pouch with a plurality of layers.

In a preferred embodiment, as shown in FIG. 4, when the chewable pouch is disintegrable and/or dissolvable, the chewable pouch 12 can include at least two layers 20, 22. Preferably, each layer includes perforations 14 that release the enclosed flavor product 16 when the pouch 10 is chewed. In an embodiment, each layer 20, 22 is impregnated with embedded flavor materials 18. Preferably, the flavor materials 18 are different in each layer 20, 22 to provide additional layers of flavor to the user.

Each layer can be made of a different dissolvable and/or disintegrable material so as to provide different characteristics in each layer. Preferably, the layers are of varying thicknesses so that each dissolves at different rates in the user's mouth. Also preferably, each layer is about 0.25 mm to about 3.0 mm thick or about 0.1 mm to about 4.0 mm.

While the foregoing has been described in detail with reference to specific embodiments thereof, it will be apparent to one skilled in the art that various changes and modifications may be made, and equivalents thereof employed, without departing from the scope of the claims.

We claim:

1. A chewable pouch product containing no tobacco or tobacco derived products which delivers flavor orally for about 2 to about 30 minutes comprising:
    a chewable pouch having at least two layers, each of said layers impregnated with at least one flavor, and each of said layers having at least one perforation therein;
    said chewable pouch further comprising a non-tobacco flavor product wherein said chewable pouch encloses said non-tobacco flavor product and said chewable pouch is orally manipulated to selectively release said non-tobacco flavor product through said perforations in said chewable pouch material; and
    said chewable pouch material is a disintegrable and/or dissolvable material.

2. The chewable pouch product of claim 1, wherein said disintegrable and/or dissolvable chewable pouch material is selected from the group consisting of gelatin, carrageenan, starch, alginate, food grade casings including meat casings, and combinations thereof.

3. The chewable pouch product of claim 1, wherein said at least two layers are sealed together.

4. The chewable pouch product of claim 3, wherein said at least two layers include different flavorants and/or different embedded flavor materials.

5. The chewable pouch product of claim 3, wherein said at least two layers are made of different materials.

6. The chewable pouch product of claim 3, wherein said at least two layers have the same thickness.

7. The chewable pouch product of claim 3, wherein said at least two layers have different thicknesses.

* * * * *